Dec. 21, 1926.　　　　　　　　　　　　　　　　　1,611,847
C. E. ANDERSON
SPEED CONTROLLED AUTOMATIC CLUTCH
Filed June 25, 1924

INVENTOR.
Carl E. Anderson
BY Sydney Prescott
ATTORNEYS.

Patented Dec. 21, 1926.

1,611,847

UNITED STATES PATENT OFFICE.

CARL E. ANDERSON, OF BROOKLYN, NEW YORK, ASSIGNOR TO AMERICAN MACHINE & FOUNDRY COMPANY, A CORPORATION OF NEW JERSEY.

SPEED-CONTROLLED AUTOMATIC CLUTCH.

Application filed June 25, 1924. Serial No. 722,207.

This invention relates to a speed-controlled automatic clutch.

When a shaft actuating a power device which operates under a substantially constant load, such for example as a pump, is to be driven by an electric motor or other power source of low starting torque, it is preferable, and in many cases necessary, to apply the power to the device gradually after the motor has attained its normal speed with accompanying full torque; otherwise, the motor would be stalled whenever the force required to overcome the inertia of the load exceeded the low starting torque of the motor. Friction clutches have been used for this purpose, but in their use the motor had to be started first and permitted to attain its normal speed or angular velocity and then the clutch had to be manually operated to complete the coupling of the driving and driven shafts.. The main object of the present invention is the production of an automatic clutch for motor driven pumps and analogous devices, which is automatically held inactive after a motor is started until the predetermined motor speed dependent upon motor torque is reached, and then automatically coming into and remaining in action at all speeds higher than the one predetermined, so that to start the pump it is only necessary to switch the current on the motor. Another object of the invention is the production of such a clutch which automatically cools the motor when in action and slows down the driven device when declutching occurs, to avoid the effects of abrupt stops. With these and other objects not specifically mentioned in view, the invention consists in certain constructions and combinations which will be hereinafter fully described and then specifically set forth in the claim hereunto appended.

Figure 1:
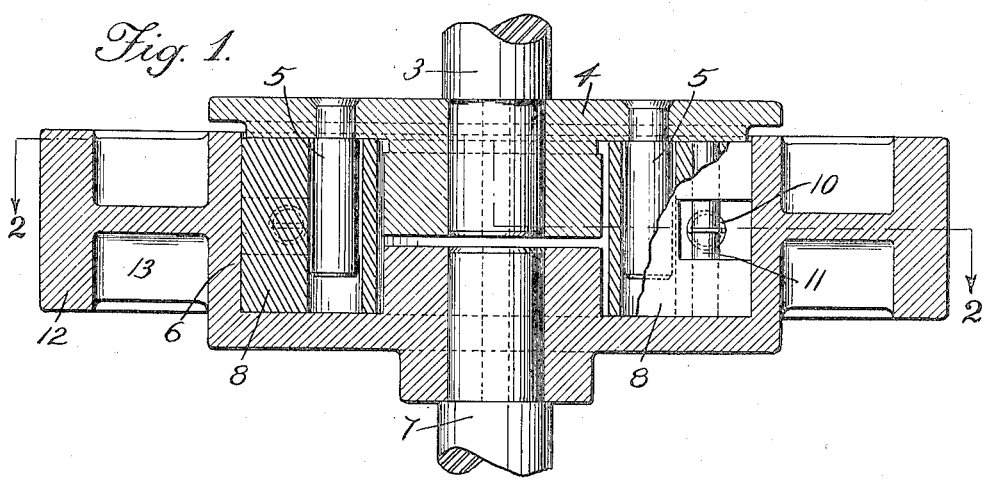
Figure 2:
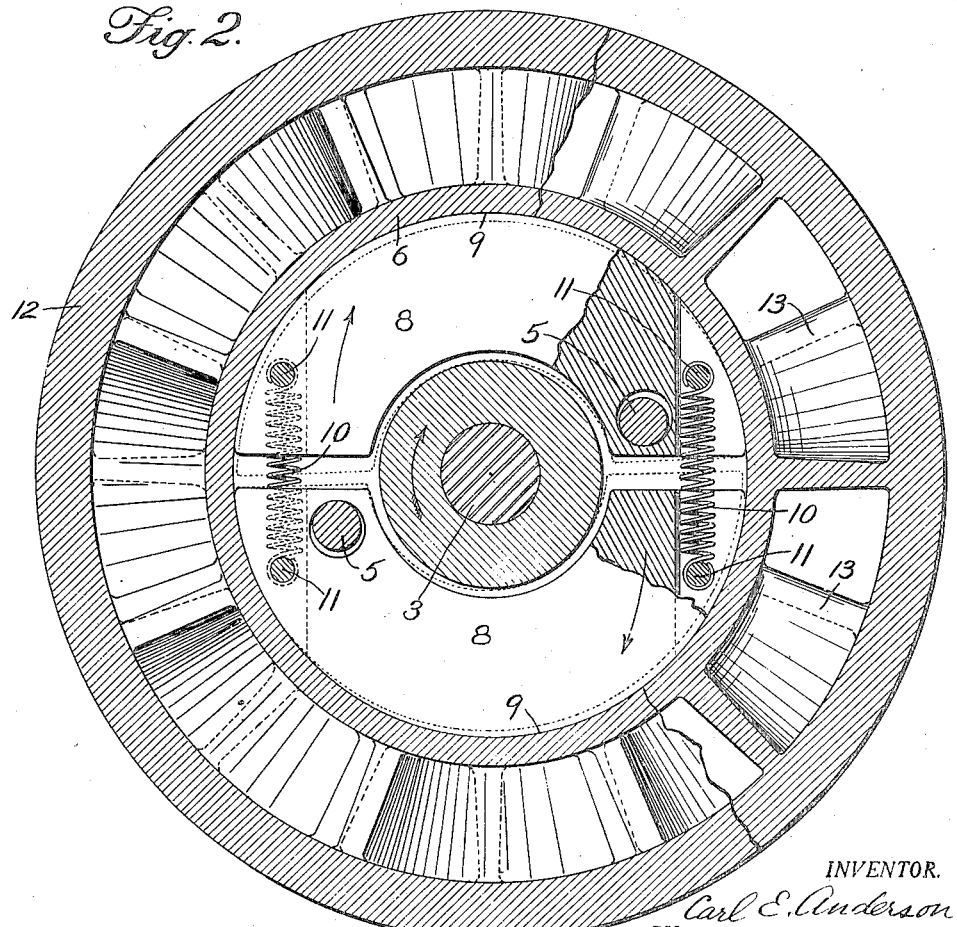

In the accompanying drawings, which form a part of this specification and in which like characters of reference indicate the same or like parts, Fig. 1 is a sectional view of a clutch constructed in accordance with the invention; and Fig. 2 is a view taken on the line 2—2 in Fig. 1.

In carrying the invention into effect, there is provided a driving element or driver, a drum or element to be driven, interposed mechanism rotated by the driver and actuated by centrifugal force to engage the drum or element to be driven at all speeds which are higher than a predetermined speed, said predetermined speed being dependent upon the torque of a motor when a motor actuates the driver, and means acting on said mechanism to counteract the centrifugal force and hold the mechanism inactive at all speeds below said predetermined speed, so that the clutch will not come into action until after a started motor has attained the speed developing torque sufficient to overcome the inertia of the load without danger of motor stalling or shock. In the best constructions, the drum or element to be driven carries a flywheel for storing energy to cause said drum or element to be driven to stop slowly when declutched, and thus avoid the effects of abrupt stops. The foregoing parts may be widely varied in construction within the scope of the claims, for the particular structure selected to illustrate the invention is but one of many possible concrete embodiments of the same. The invention therefore is not to be restricted to the precise details of the structure shown and described.

Referring to the drawings, 3 indicates a shaft which is, or may be, the shaft of an electric motor. This shaft forms a part of a driver which includes a flange 4 keyed to the shaft 3 and carrying studs 5 riveted into said flange.

There is further provided an element to be driven which is shown in the form of a drum 6, this drum being keyed to a shaft 7 which is or may be the actuating shaft of a pump or other power device to be operated.

There is further provided interposed mechanism rotated by the driver and actuated by centrifugal force to engage the drum at all speeds which are higher than a predetermined speed. As shown, this mechanism includes two shoes 8, each shoe near one of its ends being loosely pivoted to one of the studs 5. By means of the engagement of the studs 5 with the shoes 8, the latter are rotated by the driver whenever it is rotated. As clearly shown in Fig. 2, each shoe has a drum engaging surface 9 the curvature of which is the same as that of the inner perimeter of the drum, to enable the rotating shoes to rotate said drum. This centrifugal action, however, is not desired when the clutch is driven by an electric motor and the motor is started, for the reason that the motor has a low starting torque which is insufficient to pick up the load at low motor speed. Means are therefore provided which act on said mechanism to counteract the centrifugel force and hold the mechanism inactive at low motor speed. As shown, this means includes tension springs 10 hooked to pins 11 in the shoes 8, the tendency of the springs being to move the shoes on their pivots toward each other and out of engagement with the inner perimeter of the drum. The lowest motor speed at which the motor develops sufficient torque to start the load without danger of stalling the motor or subjecting the load to shock being determined, the springs 10 are provided and they have sufficient power to counteract the centrifugal force developed by the rotating shoes until this predetermined speed is reached. As the speed of the motor increases beyond this point, the centrifugal force gradually overcomes the tension of the springs, and the shoes are pressed harder and harder against the inner perimeter of the drum.

For the purpose of storing energy to cause the drum and the load to stop slowly when declutched, to avoid the effects of abrupt stops, the drum 6 is a part of a fly-wheel having a rim 12, the rim and drum being connected by a series of inclined vanes 13 which operate as a fan to cool the motor driving the shaft 3.

In view of the foregoing, a detailed description of the operation of the device is deemed unecessary and is therefore omitted in the interest of brevity.

What is claimed is:

A speed-controlled automatic clutch, comprising a driver, a flywheel fan having a drum, interposed mechanism rotated by said driver and actuated by centrifugal force to engage said drum at all speeds which are higher than a predetermined speed, said mechanism including two independently-acting oscillatory shoes independently rotated by said driver, and means acting on said mechanism to counteract said force and hold said mechanism inactive at all lower speeds, said driver including a flange, and studs carried by said flange, said shoes being loosely pivoted on said studs, and said means including springs connecting the adjacent ends of said shoes.

In testimony whereof, I have signed my name to this specification.

CARL E. ANDERSON.